(12) United States Patent
Guo et al.

(10) Patent No.: US 12,483,173 B2
(45) Date of Patent: Nov. 25, 2025

(54) DIRECT DRIVE TRANSMISSION SYSTEM AND CONTROL METHOD

(71) Applicant: AAC Technologies (Nanjing) Co., Ltd., Nanjing (CN)

(72) Inventors: Shun Guo, Nanjing (CN); Weiling Shi, Nanjing (CN); Lin Qian, Nanjing (CN); Xueyuan Zhu, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 219 days.

(21) Appl. No.: 18/334,361

(22) Filed: Jun. 13, 2023

(65) Prior Publication Data

US 2024/0195338 A1 Jun. 13, 2024

Related U.S. Application Data

(63) Continuation of application No. PCT/CN2023/087072, filed on Apr. 7, 2023.

(30) Foreign Application Priority Data

Dec. 7, 2022 (CN) .......................... 202211564744.7

(51) Int. Cl.
*H02K 11/215* (2016.01)
*H02K 41/03* (2006.01)
*H02P 25/064* (2016.01)

(52) U.S. Cl.
CPC .......... *H02P 25/064* (2016.02); *H02K 11/215* (2016.01); *H02K 41/031* (2013.01)

(58) Field of Classification Search
CPC .. H02K 11/215; H02K 41/031; G01D 5/2451; H02P 25/064
See application file for complete search history.

(56) References Cited

U.S. PATENT DOCUMENTS

| 2019/0193942 A1* | 6/2019 | Hayashi | ............... G01D 5/2451 |
| 2020/0161998 A1* | 5/2020 | Kim | ..................... H02K 11/215 |

* cited by examiner

*Primary Examiner* — Cortez M Cook
(74) *Attorney, Agent, or Firm* — Wiersch Law Group (57) ABSTRACT

The present disclosure provides a direct drive transmission system and a control method. The direct drive transmission system includes: a base plate, guide rails, a plurality of stators, a mover, a first position feedback device, a plurality of second position feedback devices, a plurality of drivers, and a controller. The first position feedback device aligns with a respective second position feedback device. The plurality of stators are configured to drive the mover to slide on the guide rails. The plurality of second position feedback devices are arranged at intervals and are electrically connected to the controller. The controller is configured to control driving operations of the plurality of drivers according to effective position information fed back by the plurality of second position feedback devices.

9 Claims, 5 Drawing Sheets

DIRECT DRIVE TRANSMISSION SYSTEM AND CONTROL METHOD

TECHNICAL FIELD

The present disclosure relates to the field of direct drive transmission system technology, and in particular to a control method for a direct drive transmission system.

BACKGROUND

With the development of motor technology, various motors are deployed on production lines in various production and manufacturing industries. The direct drive transmission systems using direct drive motors have been widely used in assembly line scenarios such as component transportation, and solutions that can accurately control the position of each transmission unit in the transmission system are gradually adopted.

In related technologies, most segmented-driving direct drive transmission systems use a position feedback scheme to feedback the position to the driver, and the controller uniformly controls all position information from driver. However, there may be a certain delay in position feedback, which leads to low response efficiency of the controller to the position, thereby affecting control efficiency.

Therefore, it is necessary to provide a new direct drive transmission system.

SUMMARY

The present disclosure aims to provide a direct drive transmission system and a control method, which can address the technical problem that the controller in the direct drive transmission systems according to the related technologies has low response efficiency to positions.

To this end, the direct drive transmission system according to some embodiments of the present disclosure includes: a base plate; guide rails fixed to the base plate; a plurality of stators fixed to the base plate and arranged along an extension direction of the guide rails; a mover slidably fitted to the guide rails and arranged to space from the plurality of stators; a first position feedback device fixed to the mover; a plurality of second position feedback devices fixed to the base plate, each second position feedback device of the plurality of second position feedback devices corresponds to a respective stator; a plurality of drivers, each driver of the plurality of drivers is electrically connected to a respective stator; and a controller electrically connected to the plurality of drivers. The first position feedback device aligns with a respective second position feedback device, and the plurality of stators are configured to drive the mover to slide on the guide rails. The plurality of second position feedback devices are arranged at intervals and are electrically connected to the controller, and the controller is configured to control driving operations of the plurality of drivers according to effective position information fed back by the plurality of second position feedback devices.

In some embodiments, a second position feedback device is arranged between two ends of a respective stator along the extension direction of the guide rails.

In some embodiments, a second position feedback device is a reading head, the first position feedback device is a grid ruler, and a length of the first position feedback device is greater than or equal to a length of a driving range of one stator along the extension direction of the guide rails.

In some embodiments, each stator of the plurality of stators includes a first magnet fixed to the base plate and a plurality of windings fixed to the first magnet and arranged at intervals along the extension direction of the guide rails. A second position feedback device is arranged between a guide rail and the plurality of windings of a respective stator, and all windings of each stator of the plurality of stators are electrically connected to a respective driver.

In some embodiments, the mover includes a mounting plate slidably fitted to the guide rails, a second magnet fixed on a side of the mounting plate facing towards the base plate, and a plurality of magnetic steels fixed on a side of the second magnet away from the mounting plate. Each magnetic steel of the plurality of magnetic steels is in correspondence to and aligns with a respective winding, and each magnetic steel of the plurality of magnetic steels is arranged to space from a respective winding.

In some embodiments, all drivers are electrically connected to the controller.

Some embodiments of the present disclosure provide a control method for a direct drive transmission system, applicable to the direct drive transmission system as illustrated above. The method includes:
  receiving effective position information fed back by a second position feedback device;
  determining a driver to be driven according to the effective position information; and
  sending a driving instruction to the driver to be driven.

In some embodiments, the first position feedback device is a grid ruler, a reading range of the first position feedback device is M-N; a second position feedback device is a reading head, for each two second position feedback devices of the plurality of second position feedback devices, a reading value of a leading second position feedback device in a moving direction of the mover is denoted as m, and a reading value of a trailing second position feedback device is denoted as n; and before receiving the effective position information fed back by the second position feedback device, the method further includes:
  in response to the mover being in a starting position, acquiring a number and reading values of at least one second position feedback device which reads from the first position feedback device;
  comparing, according to the number of the at least one second position feedback device, each reading value of the reading values with the reading range; and
  determining one reading value of the reading values as the effective position information, including:
  in response to only one reading value of the at least one second position feedback device falling within the reading range M-N, determining the reading value as the effective position information; and
  in response to two reading values of the at least one second position feedback device falling within the reading range M-N, determining whether m-M is greater than n-N; in response to m-M is greater than n-N, determining the reading value m as the effective position information; and in response to m-M is not greater than n-N, determining the reading value n as the effective position information.

In some embodiments, determining the driver to be driven according to the effective position information, includes:
  determining, according to the effective position information, the second position feedback device feeding back the effective position information; and
  determining a driver to which a stator corresponding to the second position feedback device is connected as the driver to be driven, or determining a driver to which a stator corresponding to the second position feedback device is connected and a driver to which a next stator in a moving direction of the mover is connected as drivers to be driven.

In some embodiments, after determining the driver to be driven according to the effective position information, the method further includes:

resolving the effective position information using a position resolving algorithm, to obtain an actual position value of the mover;

comparing the actual position value of the mover with a preset reference position value;

in response to the actual position value being greater than the reference position value, sending a driving instruction of reducing output current to the driver to be driven;

in response to the actual position value being less than the reference position value, sending a driving instruction of increasing output current to the driver to be driven; and in response to the actual position value being equal to the reference position value, sending a driving instruction of keeping output current unchanged to the driver to be driven.

The present disclosure has following beneficial effects: the effective position information fed back by a second position feedback device can be directly received by the controller because the plurality of second position feedback devices are electrically connected to the controller. Compared with related technologies that the position information fed back by the second position feedback device is transmitted to a driver first, and then forwarded to the controller by the driver, the controller in the present disclosure can receive the latest effective position information. In this way, response efficiency of the controller to positions can be improved, thereby improving the control efficiency of the direct drive transmission system. Moreover, requirements for the performance of the drivers can be reduced.

DETAILED DESCRIPTION OF EMBODIMENTS

The present disclosure is further illustrated below with reference to drawings and embodiments.

Figure 1:
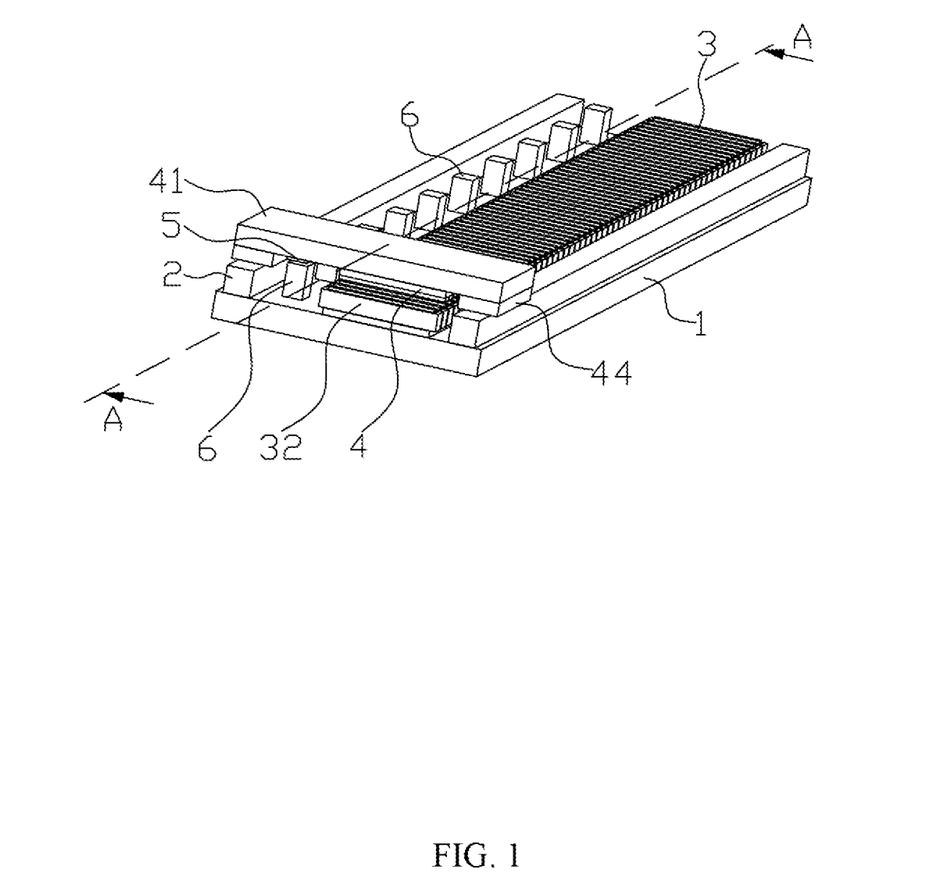
FIG. 1 is a structural diagram of the direct drive transmission system according to some embodiments of the present disclosure.
Figure 2:
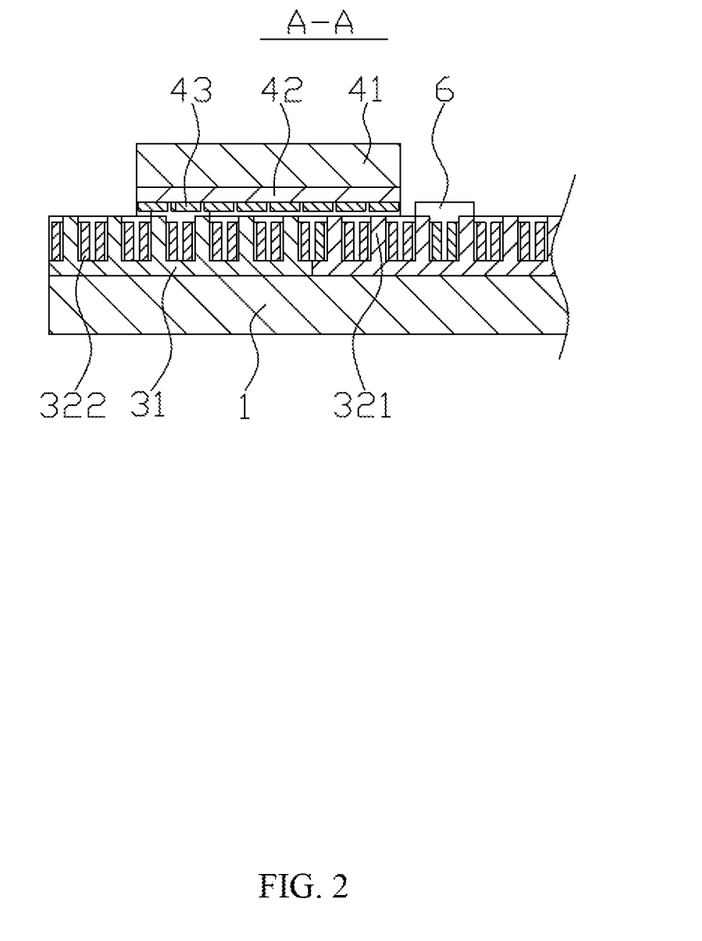
FIG. 2 is a partial sectional view along the A-A line in FIG. 1.
Figure 3:
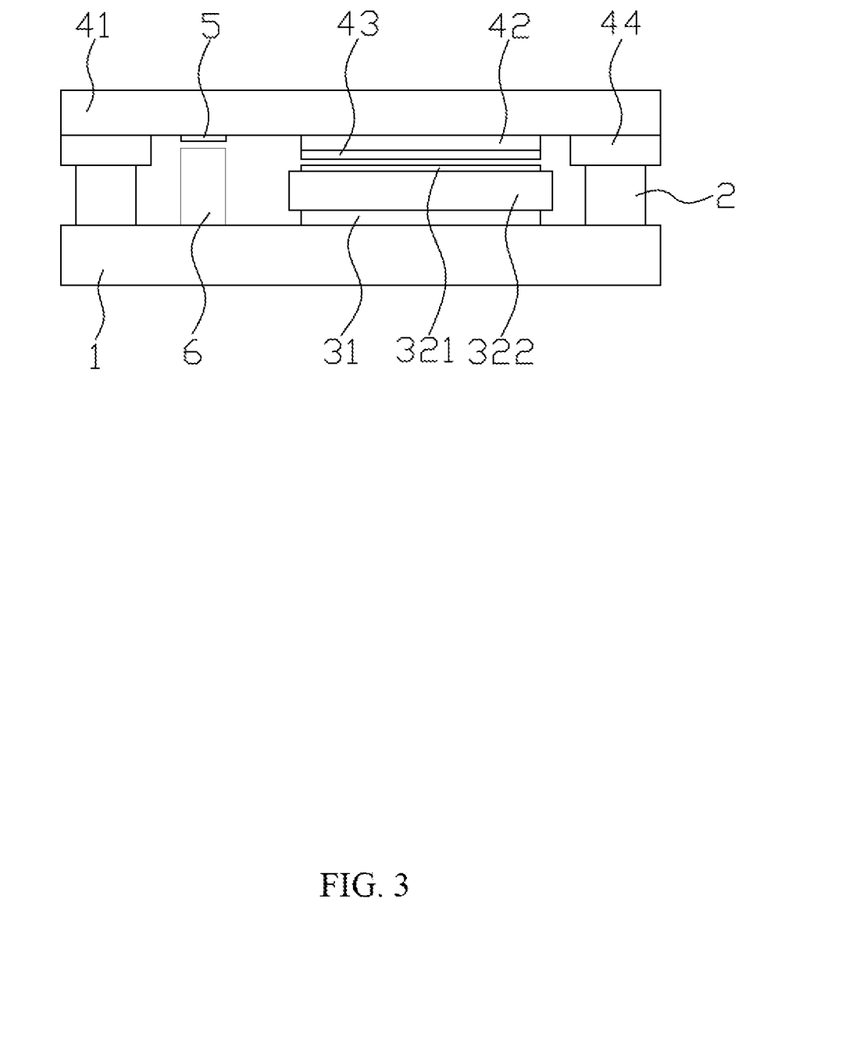
FIG. 3 is a front view of the direct drive transmission system according to some embodiments of the present disclosure.

Referring to FIGS. 1 to 3, some embodiments of the present disclosure provide a direct drive transmission system, including: a base plate 1; guide rails 2 fixed to the base plate 1; a plurality of stators 3 fixed to the base plate 1 and arranged along an extension direction of the guide rails 2; a mover 4 slidably fitted to the guide rails 2 and arranged to space from the plurality of stators 3; a first position feedback device 5 fixed to the mover 4; a plurality of second position feedback devices 6 fixed to the base plate 1, where each second position feedback device of the plurality of second position feedback devices 6 corresponds to a respective stator 3; a plurality of drivers (not shown in drawings), where each driver of the plurality of drivers is electrically connected to a respective stator; and a controller (not shown in drawings) electrically connected to the plurality of drivers. The first position feedback device 5 aligns with a respective second position feedback device 6, and the plurality of stators 3 are configured to drive the mover 4 to slide on the guide rails 2. The plurality of second position feedback devices 6 are arranged at intervals and are electrically connected to the controller. The controller is configured to control driving operations of the plurality of drivers according to effective position information fed back by the plurality of second position feedback devices 6.

The effective position information fed back by a second position feedback device 6 can be directly received by the controller because the plurality of second position feedback devices 6 are electrically connected to the controller. Compared with related technologies that the position information fed back by the second position feedback device 6 is transmitted to a driver first, and then forwarded to the controller by the driver, the controller in the present disclosure can receive the latest effective position information. In this way, response efficiency of the controller to positions can be improved, thereby improving the control efficiency of the direct drive transmission system. Moreover, requirements for the performance of the drivers can be reduced.

It is noted that in the direct drive transmission system according to the present disclosure, the driving instruction sent to one driver to which a stator 3 is connected may be different from the driving instruction sent to another driver to which another stator 3 is connected. In this way, each driver of the plurality of drivers may be in a respective unique driving mode, thereby achieving segmented driving of the direct drive transmission system. In this case, the plurality of stators 3 may be connected to each other in sequence. Alternatively, the plurality of stators 3 may be arranged at intervals to form a transmission line having driving areas provided with corresponding stators 3 and transition areas without any stator 3, thereby achieving segmented driving of the direct drive transmission system. In this case, in the transition areas of the transmission line, the mover 4 slides on the guide rails 2 with the aid of inertia.

Referring to FIGS. 1 and 3, in some embodiments, a second position feedback device 6 is arranged between two ends of a respective stator 3 along the extension direction of the guide rails 2. In some embodiments, the second position feedback device 6 may be arranged in the middle between the two ends of the stator 3, to ensure that at any moment when the mover 4 slides, the second position feedback device 6 senses the position of the first position feedback device 5.

Referring to FIGS. 1 and 3, in some embodiments, a second position feedback device 6 is a reading head, the first position feedback device 5 is a grid ruler, and a length of the first position feedback device 5 is greater than or equal to a length of a driving range of one stator 3 along the extension direction of the guide rails 2. The first position feedback device 5 may be a grating ruler or a magnetic grid ruler, and the grid ruler is mounted on the mover 4 along the sliding direction of the mover 4. The length of the first position feedback device 5 is equal to the length of the driving range of the stator 3 along the extension direction of the guide rails 2, i.e. the length of the grid ruler is equal to the length of one stator 3. Because the second position feedback device 6 is disposed in the middle of a respective stator 3, the first position feedback device 5 can be always sensed by the second position feedback device 6. In this way, a position of the mover 4 can be determined in real time.

Referring to FIGS. 1 to 3, in some embodiments, each stator of the plurality of stators 3 includes a first magnet 31 fixed to the base plate 1 and a plurality of windings 32 fixed to the first magnet 31 and arranged at intervals along the extension direction of the guide rails 2. A second position feedback device 6 is arranged between a guide rail 2 and the plurality of windings 32 of a respective stator, and all windings 32 of each stator 3 of the plurality of stators are electrically connected to a respective driver. In some embodiments, the first magnet 31 may be in a form of a flat plate. Each winding of the plurality of windings 32 includes a plurality of protrusions 321 protruded outward from a surface of the first magnet 31 away from the base plate 1 and a plurality of coils 322, each coil of the plurality of coils is wound on an outer surface of a respective protrusion 321. Each protrusion 321 may be in a rectangular shape, and the plurality of protrusions 321 are arranged at constant intervals, in order to obtain a uniform traveling-wave magnetic field generated by applying appropriate current to the plurality of windings 32. Each two adjacent coils 322 are arranged to space from each other, thereby providing heat dissipation spaces to the coils 322. By electrically connecting all windings 32 of a stator 3 to a corresponding driver, one stator 3 can be driven by one driver, in this way, number of drivers in the direct drive transmission system can be reduced, thereby reducing cost of the direct drive transmission system.

Referring to FIGS. 1 to 3, in some embodiments, the mover 4 includes a mounting plate 41 slidably fitted to the guide rails 2, a second magnet 42 fixed on a side of the mounting plate 41 facing towards the base plate 1, and a plurality of magnetic steels 43 fixed on a side of the second magnet 42 away from the mounting plate 41. Each magnetic steel of the plurality of magnetic steels 43 is in correspondence to and aligns with a respective winding 32, and each magnetic steel of the plurality of magnetic steels 43 is arranged to space from a respective winding 32. In some embodiments, there are two guide rails 2 spaced from each other, and each end of the mounting plate 41 is slidably fitted to a respective guide rail 2, which is conducive to improvement of sliding stability of the mover 4. The second magnet 42 is in a form of a flat plate, and the plurality of magnetic steels 43 are evenly arranged on the second magnet 42. Each magnetic steel 43 is in correspondence to and aligns with a respective winding 32. It should be understood that when the direct drive transmission system is in a standby mode, the plurality of magnetic steels 43 generate a magnetic field by induction, such that a gap magnetic field is generated between the plurality of magnetic steels 43 and the plurality of windings 32. A traveling-wave magnetic field may be generated by applying appropriate current to the plurality of windings 32, in this case, the gap magnetic field and the traveling-wave magnetic field interact to generate thrust between the plurality of magnetic steels 43 and the plurality of windings 32, causing the mover 4 is driven by the plurality of stators 3 to slide on the guide rails 2 in a direction of the thrust. According to actual requirements, the mover 4 may further include a sliding plate 44 fixed to the mounting plate 41, each end of the sliding plate is slidably fitted to a respective guide rail 2. The sliding plate 44 may facilitate the relative sliding between the mounting plate 41 and the guide rails 2. Moreover, the gap between the plurality of magnetic steels 43 and the plurality of windings 32 may be controlled through a thickness of the sliding plate 44.

In some embodiments, all drivers are electrically connected to the controller. In this way, significant differences in the output current of different drivers can be prevented and it facilitates collaborative control of the plurality of drivers.

Figure 4:
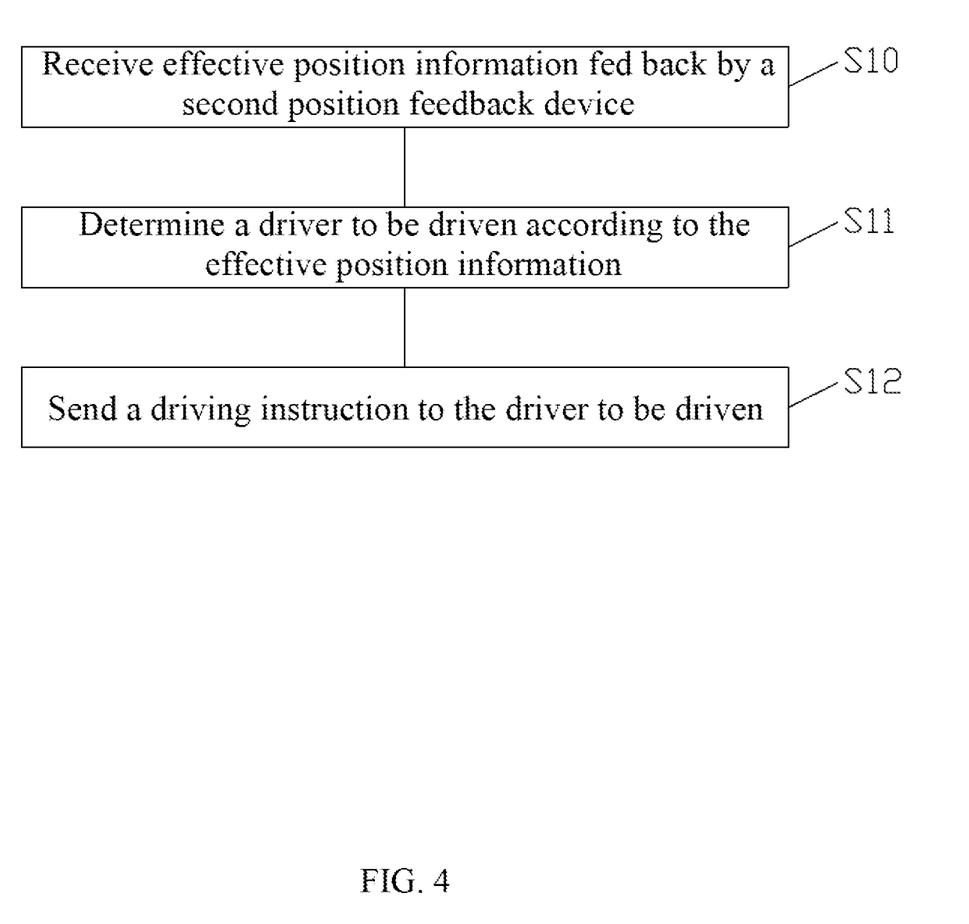
FIG. 4 is an overall flowchart of the control method for the direct drive transmission system according to some embodiments of the present disclosure.

Some embodiments of the present disclosure provide a control method for a direct drive transmission system, applicable to the direct drive transmission system as illustrated above. Referring to FIG. 4, FIG. 4 is an overall flowchart of the control method for the direct drive transmission system according to some embodiments of the present disclosure. The method includes the following operations.

At S10, effective position information fed back by a second position feedback device 6 is received.

At S11, a driver to be driven is determined according to the effective position information.

At S12, a driving instruction is sent to the driver to be driven.

With the method according to some embodiments of the present disclosure, the effective position information fed back by a second position feedback device 6 can be directly received by the controller, without forwarding by the driver. In this way, the controller can receive the latest effective position information, and response efficiency of the controller to positions can be improved, thereby improving the position feedback efficiency of the feedback devices and the control efficiency of the direct drive transmission system. Moreover, requirements for the performance of the drivers can be reduced. In the operation S12, the driving instruction sent by the controller to the driver may include a driving instruction of increasing, reducing, or maintaining the output current of the plurality of windings 32.

Figure 5:
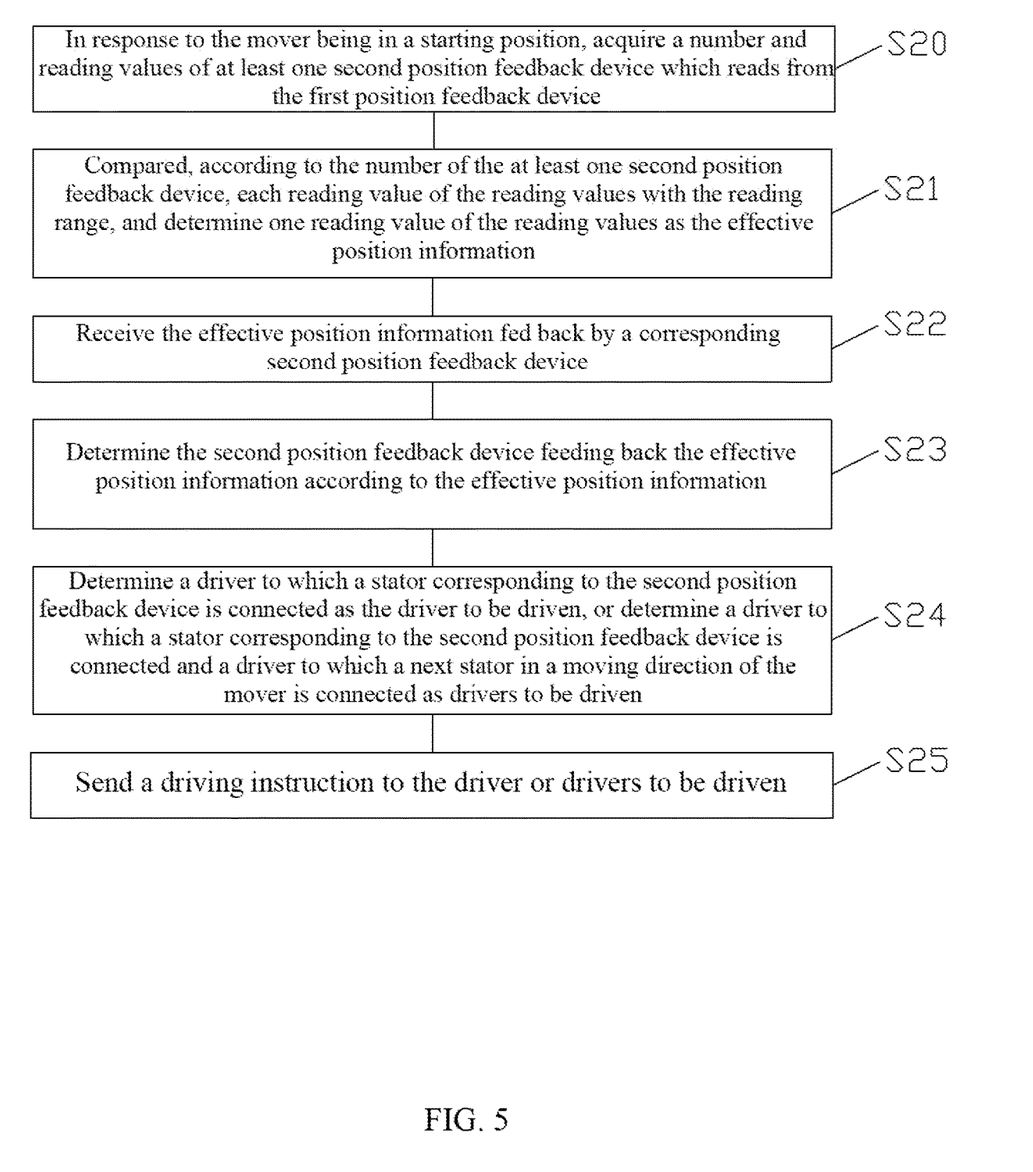
FIG. 5 is a basic flowchart of the control method for the direct drive transmission system according to some embodiments of the present disclosure.

In some embodiments, referring to FIG. 5, FIG. 5 is a basic flowchart of the control method for the direct drive transmission system according to some embodiments of the present disclosure. The method includes the following operations.

At S20, in response to the mover 4 being in a starting position, a number and reading values of at least one second position feedback device 6 which reads from the first position feedback device 5 are acquired.

At S21, each reading value of the reading values is compared, according to the number of the at least one second position feedback device 6, with the reading range, and one reading value of the reading values is determined as the effective position information.

At S22, the effective position information fed back by a corresponding second position feedback device 6 is received.

At S23, the second position feedback device 6 feeding back the effective position information is determined according to the effective position information.

At S24, a driver to which a stator 3 corresponding to the second position feedback device 6 is connected is determined as the driver to be driven, or a driver to which a stator 3 corresponding to the second position feedback device 6 is connected and a driver to which a next stator 3 in a moving direction of the mover 4 is connected is determined as drivers to be driven.

At S25, a driving instruction is sent to the driver or drivers to be driven.

In some embodiments, the first position feedback device 5 is a grid ruler, and a reading range of the first position feedback device 5 is M-N. A second position feedback device 6 is a reading head, for each two second position feedback devices of the plurality of second position feedback devices 6, a reading value of a leading second position feedback device in a moving direction of the mover 4 is denoted as m, and a reading value of a trailing second position feedback device is denoted as n. The grid ruler is mounted on the mounting plate 41 along the sliding direction of the mover 4. A plurality of reading heads are fixed to the base plate 1 along a length direction of the guide rails 2. The grid ruler aligns with a respective reading head. The plurality of stators 3 are connected to each other in sequence. A reading head is disposed in the middle between two ends of a respective stator 3. A length of the grid ruler is equal to a length of a single stator 3, in this way, there always is a reading head which reads values from the grid ruler.

In some embodiments, at S20, at the moment that the direct drive transmission system starts, a position of the mover 4 is determined as the starting position. At this time, there is one or two second position feedback devices 6 can read the reading from the first position feedback device 5.

At S21, in response to only one reading value of the at least one second position feedback device 6 falling within the reading range M-N, the reading value is determined as the effective position information. In response to two reading values of the at least one second position feedback device 6 falling within the reading range M-N, it is determined whether m-M is greater than n-N. In response to m-M being greater than n-N, the reading value m is determined as the effective position information; and in response to m-M being not greater than n-N, the reading value n is determined as the effective position information. It should be understood that the reading head has a certain length, and the operation S21 can eliminate the interference caused by the length of the reading head in obtaining the effective position information, thereby improving the position detection accuracy of the direct drive transmission system.

At S23, the effective position information corresponds to a second position feedback device 6 whose reading value is m, or a second position feedback device 6 whose reading value is n, or a second position feedback device 6 whose reading value falls within the reading range M-N. At S24, when it is determined that the effective position information corresponds to the second position feedback device 6 whose reading value is m or n, a driver to which a stator 3 corresponding to the second position feedback device 6 is connected as the driver to be driven. When it is determined that the effective position information corresponds to the second position feedback device 6 whose reading value falls within the reading range M-N, a driver to which a stator 3 corresponding to the second position feedback device 6 is connected and a driver to which a next stator 3 in a moving direction of the mover 4 is connected are determined as drivers to be driven.

In some embodiments, in order to further improve the accuracy of control, the method further includes, between the operations S11 and S12, the following operations.

At S30, the effective position information is resolved using a position resolving algorithm, to obtain an actual position value of the mover 4.

At S31, the actual position value of the mover 4 is compared with a preset reference position value.

At S32, in response to the actual position value being greater than the reference position value, a driving instruction of reducing output current is sent to the driver to be driven; in response to the actual position value being less than the reference position value, a driving instruction of increasing output current is sent to the driver to be driven; and in response to the actual position value being equal to the reference position value, a driving instruction of keeping output current unchanged is sent to the driver to be driven.

By resolving the effective position information using a position resolving algorithm to obtain the actual position value of the mover 4, and comparing the actual position value of the mover 4 with the preset reference position value, the output current provided, by the driver, to the plurality of windings 32 can be adjusted. In this way, a closed-loop control of positions can be achieved, and the accuracy of control for direct drive transmission system can be further improved. It should be understood that when the actual position value is greater than the reference position value, it is indicated that the mover 4 would go beyond a predetermined position at a predetermined moment, in this case, a driving instruction of reducing output current should be sent to the driver to be driven, in order to reduce the action force between the plurality of windings 32 and the plurality of magnetic steels 43, thereby reducing a sliding speed of the mover 4 and ensuring the mover 4 to just arrive at the predetermined position at the predetermined moment. Similarly, when the actual position value is less than the reference position value, a driving instruction of increasing output current is sent to the driver to be driven, and when the actual position value is equal to the reference position value, a driving instruction of keeping output current unchanged is sent to the driver to be driven, in order to ensure the mover 4 to just arrive at the predetermined position at the predetermined moment.

The above-described are only embodiments of the present disclosure. It should be noted that skilled persons in the art may make improvements without departing from the concept of the present disclosure. All these improvements fall into the scope of protection of the present disclosure.

What is claimed is:

1. A direct drive transmission system, comprising:
a base plate;
guide rails fixed to the base plate;
a plurality of stators fixed to the base plate and arranged along an extension direction of the guide rails;
a mover slidably fitted to the guide rails and arranged to space from the plurality of stators;
a first position feedback device fixed to the mover;
a plurality of second position feedback devices fixed to the base plate, wherein each second position feedback device of the plurality of second position feedback devices corresponds to a respective stator;
a plurality of drivers, wherein each driver of the plurality of drivers is electrically connected to a respective stator; and
a controller electrically connected to the plurality of drivers;
wherein the first position feedback device aligns with a respective second position feedback device, and the plurality of stators are configured to drive the mover to slide on the guide rails; and
wherein the plurality of second position feedback devices are arranged at intervals and are electrically connected to the controller, and the controller is configured to control driving operations of the plurality of drivers according to effective position information fed back by the plurality of second position feedback devices;

wherein a second position feedback device is arranged between two ends of a respective stator along the extension direction of the guide rails.

2. The direct drive transmission system according to claim 1, wherein a second position feedback device is a reading head, the first position feedback device is a grid ruler, and a length of the first position feedback device is greater than or equal to a length of a driving range of one stator along the extension direction of the guide rails.

3. The direct drive transmission system according to claim 1, wherein each stator of the plurality of stators comprises a first magnet fixed to the base plate and a plurality of windings fixed to the first magnet and arranged at intervals along the extension direction of the guide rails; and wherein a second position feedback device is arranged between a guide rail and the plurality of windings of a respective stator, and all windings of each stator of the plurality of stators are electrically connected to a respective driver.

4. The direct drive transmission system according to claim 3, wherein the mover comprises a mounting plate slidably fitted to the guide rails, a second magnet fixed on a side of the mounting plate facing towards the base plate, and a plurality of magnetic steels fixed on a side of the second magnet away from the mounting plate, wherein each magnetic steel of the plurality of magnetic steels is in correspondence to and aligns with a respective winding, and each magnetic steel of the plurality of magnetic steels is arranged to space from a respective winding.

5. The direct drive transmission system according to claim 1, wherein all drivers are electrically connected to the controller.

6. A control method for a direct drive transmission system, applicable to the direct drive transmission system according to claim 1, comprising:

receiving effective position information fed back by a second position feedback device;

determining a driver to be driven according to the effective position information; and sending a driving instruction to the driver to be driven.

7. The method according to claim 6, wherein the first position feedback device is a grid ruler, a reading range of the first position feedback device is M-N;

wherein a second position feedback device is a reading head, for each two second position feedback devices of the plurality of second position feedback devices, a reading value of a leading second position feedback device in a moving direction of the mover is denoted as m, and a reading value of a trailing second position feedback device is denoted as n; and wherein before receiving the effective position information fed back by the second position feedback device, the method further comprises:

in response to the mover being in a starting position, acquiring a number and reading values of at least one second position feedback device which reads from the first position feedback device;

comparing, according to the number of the at least one second position feedback device, each reading value of the reading values with the reading range; and determining one reading value of the reading values as the effective position information, comprising:

in response to only one reading value of the at least one second position feedback device falling within the reading range M-N, determining the reading value as the effective position information; and in response to two reading values of the at least one second position feedback device falling within the reading range M-N, determining whether m-M is greater than n-N; in response to m-M being greater than n-N, determining the reading value m as the effective position information; and in response to m-M being not greater than n-N, determining the reading value n as the effective position information.

8. The method according to claim 6, wherein determining the driver to be driven according to the effective position information, comprises:

determining, according to the effective position information, the second position feedback device feeding back the effective position information; and determining a driver to which a stator corresponding to the second position feedback device is connected as the driver to be driven, or determining a driver to which a stator corresponding to the second position feedback device is connected and a driver to which a next stator in a moving direction of the mover is connected as drivers to be driven.

9. The method according to claim 6, wherein after determining the driver to be driven according to the effective position information, the method further comprises:

resolving the effective position information using a position resolving algorithm, to obtain an actual position value of the mover;

comparing the actual position value of the mover with a preset reference position value;

in response to the actual position value being greater than the reference position value, sending a driving instruction of reducing output current to the driver to be driven;

in response to the actual position value being less than the reference position value, sending a driving instruction of increasing output current to the driver to be driven; and in response to the actual position value being equal to the reference position value, sending a driving instruction of keeping output current unchanged to the driver to be driven.

* * * * *